United States Patent Office 3,350,370
Patented Oct. 31, 1967

3,350,370
PROCESS FOR TERPOLYMERIC SOLVENT-FREE HYDROCARBON CRUMBS
William John Keller and Albert Lloyd Moore, Wilmington, Del., assignors to E. I. du Pont de Nemours and Company, Wilmington, Del., a corporation of Delaware
No Drawing. Filed Mar. 29, 1963, Ser. No. 269,188
2 Claims. (Cl. 260—80.78)

This invention relates to isolating copolymers from a solution and, more particularly, it relates to isolating α-olefin hydrocarbon copolymers from solution in particulate form.

α-Olefin hydrocarbon copolymers are acquiring increasing commercial importance today in the manufacture of a wide variety of useful elastomeric articles. Frequently, these copolymers are prepared in solution with the aid of coordination catalysts; however, it is usually necessary to remove the copolymer from solution in order to carry out further operations on it, such as molding and curing.

There are several known procedures for isolating these coploymers from solution. In one of them, the copolymer is precipitated by admixture of its solution with a nonsolvent such as an alcohol; however, this method suffers from several disadvantages in commercial practice. In the first place, it requires the use of large volumes of alcohol which must be subsequently recovered for reuse. In the second place, the copolymer tends to separate as a viscous, agglomerated mass which is inconvenient and expensive to handle and difficult to free from residual solvent. An alternative procedure is removal of the solvent with a drum dryer. This method is entirely satisfactory from the standpoint of obtaining a solvent-free copolymer but, in commercial practice, it suffers from several disadvantages including the necessity of protection against explosion hazards and the large capital costs for the drying equipment.

Although, reportedly, certain ethylene/propylene copolymers can be isolated by introducing their solutions into hot water under pressure, optionally in the presence of steam, it has been found that such an approach does not lead to the isolation of the solvent-free copolymer in the 2–5 mm. crumb form desired. These copolymers tend to separate from solution on contact with water under conditions of strong agitation in the form of long stringy filaments which are difficult to manage and from which the removal of the solvent to the desired extent is very difficult. While it is acknowledged that agglomeration is a problem with many elastomeric materials, the α-olefin copolymers exhibit an extraordinarily high agglomeration tendency over a wide range of solution concentrations. Further, this tendency is aggravated by the fact that the copolymers are lighter than water and float on the top of a vessel there agglomerating into a viscous blanket retarding the escape of solvent vapor.

It is, therefore, an object of this invention to provide a process for the isolation of α-olefin copolymers in the form of solvent-free, finely divided crumbs of small dimension. Another object is to provide such a process which can be conducted simply and inexpensively without the need for complex equipment and techniques. A further object is to provide such a process wherein solvent loss and copolymer loss is kept at a low level.

These and other objects are accomplished in accordance with this invention by a process for producing solvent-free, finely divided crumbs of a water-insoluble α-olefin hydrocarbon copolymer which comprises: (I) forming an unstable oil-in-water dispersion in a continuous aqueous phase by mixing with high-shear agitation (a) a solution of said copolymer in a volatile, inert organic solvent with (b) water containing a surface-active dispersing agent, the volume ratio of (a) to (b) being within the range of from 1:4 to 2:1; (II) mixing said dispersion with steam while applying vigorous agitation to the mixture thereby removing said solvent from the mixture; and (III) continuously removing the crumbs of copolymer thereby formed.

This invention avoids the undesired agglomeration of the precipitated copolymer in the form of viscous gummy masses from which solvent separation is difficult and inconvenient. A very important feature is the formation of an unstable oil-in-water dispersion having a continuous aqueous phase and its contact with steam, while agitated in non-laminar motion, in a vessel having a hydrophilic surface to remove a major portion or essentially all of the organic solvent. The formation of this dispersion makes it possible to control the aggregation of the precipitating copolymer particles so that crumbs of the proper dimensions are obtained. The control is effected by the presence of a small amount of the surface-active dispersing agent in combination with the non-laminar agitation in a vessel having a hydrophilic lining. The invention uses only enough surfactant to disperse the copolymer into particles of a readily handled size (e.g., 0.5–5 mm.). The low amount of surfactant is insufficient to give a stable suspension; a mechanical mixer and turbulent flow in the feed line are also needed. If laminar flow is used, the suspension separates almost immediately.

An important characteristic of the copolymer solutions which are treated by process of the present invention is that they are stable at room temperature (i.e., about 25° C.). Homopolymers such as polyethylene are not soluble to any significant extent at room temperature and the major portion of such homopolymers can be readily isolated in a convenient form merely by cooling the polymer solution. In such cases the residual polyethylene is a low molecular weight wax or oil of lesser value, the precipitation essentially separating all of the useful high molecular weight polymer. In contrast, the copolymer solutions will not deposit copolymer when cooled to room temperature; and thus all the copolymer isolation must be carried out by the process of the present invention itself.

The solution comprises the water-insoluble copolymer and a volatile inert organic liquid. The term "inert" means that the liquid does not harm the copolymer or adversely affect the isolation of the copolymer by the process of the present invention; the term "volatile" means that the liquid can be steam distilled at atmospheric pressure at temperatures below about 100° C. The partial pressure of the solvent in the steam treatment zone will depend on the solvent-polymer equilibrium. In general, the preferred solvents have a boiling point not exceeding about 150° C. at atmospheric pressure. Higher boiling solvents can be removed by atmospheric steam distillation at temperatures below 100° C. but more steam is required and the rates are lower. Materials which are relatively high boiling can be employed but are less readily removed. Representative solvents include aliphatic hydrocarbons such as pentane, hexane, heptane, or iso-octane; petroleum ether; cycloaliphatic compounds such as cyclopentane and cyclohexane; aromatic hydrocarbons such as benzene, toluene, mixed xylenes, cumenes, and ethyl benzene; halogenated aliphatic hydrocarbons such as carbon tetrachloride, tetrachloroethylene, trichloroethylene, and dichlorodifluoromethane; chlorinated aromatic hydrocarbons such as chlorobenzene and meta-fluorotoluene. Compatible mixtures of these solvents can be employed by those skilled in the art when desired.

The age and the origin of the copolymer solution are not critical to the operation of the present invention except as noted below. The solution most often used is the effluent from the copolymerization vessel wherein the copolymer product was made. Representative examples of procedures for making such copolymer solutions are given in U.S.

Patent 2,933,480 (issued to Gresham and Hunt), U.S. Patent 2,975,189 (issued to Weinmayr), U.S. Patent 3,000,866 (issued to Tarney); U.S. Patent 3,000,867 (issued to Fisher); U.S. Patent 3,063,973 (issued to Gladding and Nyce); British Patent 857,183; and French Patents 1,285,090 and 1,302,960. Alternatively, the copolymer can be formed as a slurry, and thereafter brought into solution by heating or by dissolving the slurry itself in an appropriate solvent or by removing the slurry liquid medium and dissolving the dry copolymer in a solvent. In addition, the copolymer can be prepared in one or more solvents, and either isolated from the solvents by conventional methods, such as drum drying, and dissolved anew in a second solvent or mixtures of solvents, or it can be transferred in solution into a second solvent and the first solvent distilled off.

The concentration of the copolymer solution is not critical but should be low enough to permit convenient handling. As will be understood by those skilled in the art, other conditions being equal, the solution viscosity will decrease as the temperature is raised and the concentration is lowered. The viscosity also depends on the molecular weight; the higher the molecular weight, the higher the viscosity. Frequently, the concentration will range from about 3 to 15% by weight, more concentrated solutions often being too viscous for convenient large-scale handling. It is generally uneconomical to use the very large volumes of solvent needed for the concentrations to fall below about 3 percent by weight. If the solution is too dilute (e.g., only 0.1 weight percent of copolymer) removal of the solvent will give the copolymers in an exceptionally finely divided form which will be less convenient to collect than the crumbs obtained from more concentrated solutions.

The hydrocarbon copolymers which are isolated by the process of this invention are normally solid copolymers of at least one α-monoolefin and at least one other copolymerizable monomers selected from the group consisting of α-monoolefins and non-conjugated polyolefins. The preferred copolymers contain from about 20 to about 75% by weight of ethylene units. The particularly preferred copolymers are sulfur-curable and have side-chain unsaturation resulting from incorporated units of non-conjugated polyolefins. When cyclic polyolefins are employed, it is preferred that the monoolefin units in the copolymer amount to at least about 75% of the copolymer, concentrations of about 85% or more sometimes being particularly preferred. Most preferred are copolymers containing the following units by weight: 35–68% ethylene; 30–50% propylene; and 2–15% 1,4-hexadiene. In general, it is preferred that the copolymers have Mooney viscosities (ASTM Method D 1646-61; ML-4/100° C.) of at least about 40. The tendency of the copolymers to agglomerate when their dispersions are treated with steam increases as their Mooney viscosities decrease. Those skilled in the art can adjust the operating conditions by routine empirical experiments to minimize agglomeration when low Mooney viscosity copolymers are isolated. The tendency of a copolymer to agglomerate is not as pronounced at lower temperatures as it is at higher temperatures at constant solvent concentration in the copolymer. These copolymers having low Mooney viscosities should be isolated at as low an operating temperature as effective solvent removal will permit; reduced pressure can be helpful. The type and amount of dispersing agent can be varied also, by routine experimentation to minimize the agglomeration. The type and amount which tend to give smaller particles or stable dispersions in the case of high Mooney viscosity (e.g., ML-4/100° C.=80) copolymers, tend to minmize the agglomeration of copolymer crumbs in the case of low Mooney viscosity copolymers.

Representative examples of useful α-monoolefins having the structure R—CH=CH₂ include: ethylene; propylene; 1-butene; 4-methyl-1-pentene; 1-pentene; 1-hexene; 1-heptene; 1-octene; 1-decene; 5-methyl-1-nonene; 5,5-dimethyl-1-octene; 4-methyl-1-hexene; 4,4-dimethyl-1-pentene; 5-methyl-1-hexene; 4-methyl-heptene; 5-methyl-1-heptene; 4,4-dimethyl-1-hexene; 5,6,6-trimethyl-1-heptene; 1-dodecene; and 1-octadecene. The straight-chain members are preferred.

The representative dienes include dicyclopentadiene; aliphatic C₅–C₂₂ dienes having the structure

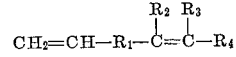

wherein $R_1$ is an alkylene radical, $R_2$, $R_3$ and $R_4$ are independently selected from the group consisting of hydrogen and alkyl radicals; 5-alkenyl-substituted-2-norbornenes; 5-methylene-2-norbornene; and 2-alkyl-2,5-norbornadienes. Representative examples of copolymers of these dienes are described in U.S. Patents 3,063,973, 3,000,866 and 2,933,480, and French Patents 1,295,575 and 1,285,090. Representative copolymers include:

ethylene/propylene;
ethylene/1-butene;
ethylene/propylene/1-butene;
ethylene/propylene/1-hexene;
ethylene/propylene/1,4-hexadiene;
ethylene/propylene/dicyclopentadiene;
ethylene/propylene/5-methylene-2-norbornene;
ethylene/propylene/2-methyl-2,5-norbornadiene;
ethylene/propylene/5-(1'-propenyl)-2-norbornene;
ethylene/propylene/5-(2'-butenyl)-2-norbornene; and
ethylene/propylene/5-(2'-ethylbutenyl)-2-norbornene.

A critical feature of this invention is the presence of a surface-active dispersing agent in the oil-in-water dispersion which is subjected to steam treatment. This agent has a dual function. First, it permits the formation of a suitable oil-in-water dispersion. Secondly, it (in combination with the turbulent agitation in a vessel having a hydrophilic lining) helps control the degree of agglomeration of the copolymer particles set free by the volatilization of the solvent from the dispersion during the steam treatment. If this agent is not used, the copolymer will separate in a partially agglomerated stringy form which is less easy to free from solvent. Non-ionic agents are particularly satisfactory. Mixtures of one type may be employed when desired, e.g., two or more non-ionics. The term "unstable dispersion" means that the dispersion if left standing under ordinary storage conditions will break in less than about five minutes; the preferred dispersions break in a few seconds.

Although an oil-in-water dispersion is employed in the present invention, it is not necessary that the surface-active agent be the kind which gives oil-in-water dispersions under all conditions. The formation of an oil-in-water rather than a water-in-oil dispersion is largely determined by the volume phase ratio of polymer solutions to water. Thus, in the case of solutions of ethylene/propylene/1,4-hexadiene copolymers in tetrachloroethylene, an oil-in-water dispersion will be formed if the solution amounts to about 50% or less by volume of the total volume of water and solution; in contrast, in the case of solutions of ethylene/propylene/1,4-hexadiene copolymers in n-hexene, oil-in-water dispersions of higher concentrations, up to 60% by volume can be formed.

Non-ionic agents such as mono-(and di-) long-chain alkyl ethers of polyethyleneether glycol are particularly useful. Anionic surface-active agents can be used such as sodium salts of long-chain alkyl substituted aryl sulfonic acids, or of long-chain alkyl sulfonic acids, or of high molecular weight carboxylic acids. Further representative examples are the tertiary amine salts of long-chain alkyl acid sulfate esters, alkyl sulfonic acids, or alkyl aryl sulfonic acids; and the sodium sulfates of alkylated naphthalene-formaldehyde condensation products.

The terminology "dispersing agents" is well understood by those skilled in the art and is set out in detail in the book "Surface Active Agents," Schwartz and Perry, Interscience Publishers, Inc. (1949), pp. 342–345, particularly p. 344. Pages 202–206 of Schwartz and Perry, supra, describe suitable non-ionic water-soluble dispersing agents. Representative agents of this type include nonyl phenyl monoethers of polyethylene ether glycol. An agent of this type is made by reacting various proportions of ethylene oxide with nonyl phenol. Depending upon the proportion of ethylene oxide employed, the resulting surface active agent of this type can be very water soluble, slightly water soluble, or essentially water insoluble. The preferred agent is made by reacting about 6–40, particularly 15–20, molar proportions of an ethylene oxide with 1 molar proportion of the nonyl phenol; these water soluble agents are commercially available as "Igepal" CO–730 and CO–850 (which are particularly preferred) and CO–510, CO–630, CO–880, CO–890, CO–970, and CO–990. Further descriptions of dispersing agents may be found on page 148 of Clayton's "The Theory of Emulsions and Their Technical Treatment," Fifth Edition by C. G. Cumner, the Blakiston Co., N.Y., 1954; pages 26, 30, 96, and 103 of "Emulsions and Foams," Berkman and Egloff, Reinhold Publishing Co., N.Y., 1941; and page 158 of "Surface Activity," Moilliet and Collie, D. Van Nostrand, N.Y., 1951.

From about 0.1 to 2% of the surface-active dispersing agent based on the weight of the copolymer (or 0.01 to 0.1% based on the weight of the water) will usually be sufficient to produce the proper polymer dispersion. For reasons of economy, it is generally preferred to use as low a concentration as possible. There is usually no particular advantage in using high concentrations of the surface-active agents. The particle size of the copolymers isolated thereafter may be smaller than preferred if too much surface-active agent is used.

The oil-in-water dispersion can be made at any temperature between about 20 to 150° C., temperatures ranging between 50 to 100° C. being preferred. Temperatures near or above the operating temperature of the steam still are preferred because the polymer solution is then brought rapidly to the vaporization temperature and solvent removal occurs more rapidly than would be the case with a cooler feed which has to be heated in the still before vaporization can occur. Because of the instability of the concentrated oil-in-water dispersions, they should be formed just prior to introduction into the still.

In forming the dispersion, agitation is critically important. This may be provided by any conventional procedure such as well known to those skilled in the art, e.g., by various high-shear line mixers. The mixer should be located near the steam treatment zone.

In preparing the dispersion the relative volume of water to solution can vary from about 4:1 to about 1:2, ratios in the range 2:1 to 1:1 being preferred. From the economic standpoint (e.g., minimizing heat requirement), it is preferred to employ the smallest possible amount of water. The minimum value of the ratio of water to copolymer solution varies with the particular copolymer-solvent system being used and depends on the volume ratio value at which inversion to a water-in-oil dispersion occurs. Those skilled in the art can readily determine the minimum for a particular system by routine experiments. It is to be understood that the system is readily operable when higher proportions of water are employed. Indeed, on occasion the use of higher ratios of water to copolymer solutions may be desirable, as for example when viscous copolymer solutions are employed which are difficult to suspend in water.

The order of addition of the compounds is not critical. It is frequently preferred to add the surface-active dispersing agent to the water and then introduce the organic solution; the mixture of agent and water can be introduced into the organic solvent. Alternatively, the surface-active dispersing agent can be admixed with the polymer solution and the resulting admixture added to the water or the water can be added to it.

Introduction of a small amount of copolymer solution into a large volume of water per se will not result in copolymer coagulation. However, if the relative amounts and the temperatures of the phases are such that the temperature of the mixture is above that at which solvent vaporizes, coagulation will then occur. This can be avoided by raising the pressure in the feed system above that of the combined vapor pressures of water and solvent at the mixture temperature. Those skilled in the art can readily adjust their procedures by routine experiments in accordance with their observations.

Extending oils (e.g., naphthenic, paraffinic, and aromatic petroleum oils) and antioxidants (e.g., 4,4-thiobis (2-tert-butyl-5-methylphenol) can be added to the dispersion if desired.

The stability of the suspension of copolymer solution in water will depend on the type and concentration of dispersing agent and on the proportion of water present. In order that the copolymer be isolated in the preferred form of crumbs having diameters the range of about 0.5 to 5 millimeters, it is desirable to form a rather unstable dispersion and introduce it within a few seconds into the steam treatment zone. Such a dispersion generally results when the preferred proportions of dispersing agent and water, set out above, are employed. More stable dispersions can be made by using higher proportions of water, but this is in general economically undesirable. A completely stable dispersion is not used in this invention; removal of the solvent would lead to the formation of a stable latex necessitating further operations, e.g., coagulation, to obtain copolymers in the crumb form desired.

After the oil-in-water dispersion has been made, either by a batch or a continuous procedure, the organic solvent is removed by contacting the suspension with steam under conditions of high-shear turbulent agitation. The dispersion can be introduced into the steam contacting zone at any point. Because the copolymer is lighter than water, it is preferred to introduce the dispersion at or near the bottom of the zone. The steam can be introduced, likewise, at any place in the zone; preferably it is introduced near the inlet for the oil-in-water dispersion. It is to be understood that the unstable dispersion should be kept in turbulent flow (non-laminar flow as contrasted to viscous or laminar flow). Dispersions suitable for use in this invention will separate otherwise. The steam distillation zone can be operated at atmospheric pressure, subatmospheric pressure, or super atmospheric pressure, atmospheric pressure being generally preferred. Those skilled in the art will recognize that the operating pressure can be raised or lowered in order to compensate for the increased volatility or decreased volatility of the organic solvent as the case may be. Generally, the steam is introduced continuously; however, it may be introduced intermittently. In any case, it should be introduced at such a rate and in such as quantity as to remove essentially all the organic solvent if a single steam contacting chamber is employed, or at least a major portion of the organic solvent if two or more steam zones are employed in sequence.

The initial separation of the copolymer from the dispersion must be controlled very carefully to avoid agglomeration. While the dispersing agent for the dispersion assists in controlling the agglomeration, it is also critically important that the system be in a state of turbulent motion during this separation. This can be conveniently accomplished by using a baffled vessel equipped with a high-shear agitator. If the baffles are omitted from this arrangement, the system will be swirled about in somewhat of a laminar manner, traveling more or less in a horizontal plane about the agitator. When the baffles are present, the elements of system tend to travel in all directions within the vessel in a manner approximating turbulent flow within a pipe. Those skilled in the art will readily understand that turbulent conditions can be achieved by means other than baffles, e.g., two agitators at right angles to each other could be used.

It is important that the vessel have a hydrophilic liner, for if the surface is not hydrophilic, copolymer will agglomerate on it and tend to coat it completely. Surfaces such as glass or wood are particularly preferred. For best results the hydrophilic walls should be continually washed with a stream of hot water.

If a series of steam zones or stages is employed, the hydrophilic lining and the turbulent agitation are only critical for the first zone. These features are preferably incorporated in the rest but it is sufficient if conventional agitation is provided.

The temperature in the steam distillation vessel is dependent on the solvent, solvent-copolymer interaction, and the desired level of solvent removal. For operation at atmospheric pressure, the minimum temperature in the vessel is 2–10° C. above the atmospheric steam distillation temperature for the solvent itself. This minimum operating temperature is that at which the copolymer (with the residual solvent) is a solid crumb having tackiness sufficiently low that the dispersing agent and high-shear agitation are able to prevent gross agglomeration and fouling from occurring. The upper temperature of operation is in the range 90–100° C. at atmospheric pressure for removal of solvent to or below the 2% level (based on the weight of copolymer). The temperature necessary varies with the volatility of the solvent over the copolymer. At atmospheric pressure, all the solvent would be removed when the distillation temperature reached 100° C. The choice of the temperature will depend also upon the number of steam distillation vessels to be employed. If only one vessel is used the temperature should be high enough to cause essentially complete removal of the organic solvent. It is preferred for reasons of economy to employ at least two steam vessels, the second being hotter than the first.

The residence time in the steam distillation vessel will depend upon the number of vessels employed and the nature of the surface-active dispersing agent. It does not depend to any noticeable extent on the concentration of the polymer solution. Those skilled in the art can determine by routine experiments, the most useful residence time for any particular solution. In general, the total residence time will range from 0.5 minute to 30 minutes; 1 to 5 minutes being preferred in the first stage, 2–20 minutes in the second stage of a 2-stage steam system. After the major portion of the organic solvent has been removed in the first stage the danger of agglomeration is much reduced; accordingly, if further steam distillation stages are employed, it is not essential to employ specific material of construction for them such as glass or wood, nor is it as essential to provide extremely vigorous agitation.

After the copolymer crumbs are free from residual solvent, they can be collected by any conventional means such as filtration, screening, or centrifugation; before or after such treatment, they can be washed with water or other reagents for special purposes. The major part of the water removal from the screened wet crumbs is done mechanically, e.g., by squeeze rolls. The dry copolymer is ultimately obtained by removing the last water by heat using such well-known procedures as oven drying, mill drying and the like. The dried copolymers should contain no more than 2% solvent and 1% water by weight. The amount of allowable residual solvent varies somewhat with the nature of the solvent; the upper limit for flammable hydrocarbons (e.g., hexane) is about 0.5%.

The invention will now be described in and by the following examples of preferred embodiments wherein parts and percentages are by weight unless otherwise specified.

EXAMPLE I

A 4% solution of an ethylene/propylene/1,4-hexadiene copolymer in tetrachloroethylene is prepared in accordance with the general directions of U.S. Patent 2,933,480 by reacting the monomers in the presence of a catalyst made by mixing vanadium oxytrichloride and diisobutyl aluminum monochloride. The copolymer contains the following percentages of monomer units: 51.5% ethylene, 45% propylene and 3.5% 1,4-hexadiene; the Mooney viscosity (ML–4/100° C.) is about 93.

An aqueous solution of surface-active dispersing agent is prepared which contains 0.43 gram per liter of a condensation product of 20 moles of ethylene oxide with one mole of sorbitan monooleate ("Tween 80" commercially available from Atlas Powder Co., Wilmington, Delaware).

The oil-in-water dispersion is prepared by separately feeding 77 ml./minute of the copolymer solution at 25° C. and 180 ml./minute of the aqueous surfactant solution at 95° C. to the bottom of a mixer consisting of a pump operated at 1725 r.p.m. fitted with an agitator modified by replacing the usual impeller by a disk from which 4 quadrants had been removed and which was arranged horizontally disposed at the bottom. The 30% oil-in-water dispersion emerges from the side of the mixer at about 71–75° C. and contains about 1.6% surfactant based on the weight of the copolymer.

After a hold-up time of about 0.2 minute in the pump the dispersion enters the base of a first-stage steam still consisting of a "Pyrex" pipe reducing T 6 inches in inside diameter and 18 inches in length having an outlet 2 inches in inner diameter half-way up one side leading to the second stage. Plates are fastened to the top and bottom of the glass chamber by standard pipe flanges. The bottom plate contains the suspension feed inlet, a donut-shaped steam sparger about the suspension feed inlet, a thermometer inlet, a drain and fill line, and a polytetrafluoroethylene bearing for an agitator shaft located at the center of the pipe. The top plate contains a thermowell, a 1-inch vapor line to a condenser, and bearings for the agitator shaft. Removable impellers (4 blades, pitched or straight paddles, 3-inch diameter) are attached to the shaft. Four full length glass baffles ½-inch wide are positioned to create turbulence. Spray discs permit washing of the upper walls with hot water. The temperature of the first stage is about 94.5° C. and the agitator is rotated at about 1250 r.p.m. During the residence time of about 4 minutes the major portion of the solvent and unreacted monomer is removed yielding finely divided crumbs of copolymer.

The outlet from the first stage is passed to the center of the second stage steam still which consists of a "Pyrex" reducing T identical to that described above for the first stage except: (1) the bottom plate contained no feed inlet; and (2) it was fitted with a 2-inch (inner diameter) inlet tube which was attached to the outlet side arm of the first stage. The second stage is maintained at 99.5° C. and the agitation rate is 1440 r.p.m. During the residence time of about 4 minutes the copolymer crumbs are freed from the remaining monomer and solvent. The slurry overflowing from the second stage is passed through a screen to collect the polymer crumbs which are about 0.5 to 3 mm. in diameter. During the operation of this continuous isolation process the copolymer is obtained at the rate of about 5.4 grams per minute and the tetrachloroethylene distills off at the rate of about 71 ml./min. After about 127 minutes the distillate from the first stage amounts to about 7530 ml. of water and about 8740 ml. of tetrachloroethylene; the distillate from the second stage amounted to 1460 ml. of water and 120 ml. of tetrachloroethylene.

EXAMPLE II

The general procedure described in Example I above is employed except as noted hereafter. The apparatus of Example I is modified in that wood baffles are installed in the first stage, extending from the bottom of the vessel to the liquid surface; the slurry outlet in the second stage is installed near the bottom of the vessel to allow longer residence time; and, stainless steel baffles in the second stage are modified to extend from the bottom of the vessel to the liquid surface. A 3% solution of the ethylene/propylene/1,4-hexadiene copolymer of Example I in tetrachloroethylene is supplied at the rate of 152 ml. per minute, corresponding to 7 grams per minute of copolymer. A solution containing 0.26 gram per liter of a surfactant (commercially available from General Aniline & Film Corp. as "Igepal CO–850") made by reacting 20 moles of ethylene oxide with one mole of nonylphenol, is supplied at the rate of 225 ml./min. The 40% oil-in-water dispersion emerging from the mixing zone contains 0.8% of surfactant based on copolymer and is at a temperature of about 70–75° C. The first steam distillation zone is maintained at 93.5° C., upper walls sprayed by 82° C. water at the rate of 200 ml. per minute, and agitated at the rate of 1150–1290 r.p.m. The second steam distillation stage is maintained at a temperature of 99.7° C., upper walls sprayed by 82° C. water at the rate of 200 ml. per minute, and agitated at the rate of 1450–1550 r.p.m. The residence time in the first and second stages is 2 minutes and 13 minutes, respectively. In the first stage the distillation rate is about 137 ml./min. of tetrachloroethylene and about 86 ml./min. of water; in the second stage the distillation rate is about 4.2 ml./min. of tetrachloroethylene and about 31 ml./min. of water. The effluent from the second stage provides polymer at the rate of 7 grams per minute in solvent-free particulate form.

EXAMPLE III

The apparatus of Example II and the general procedure of Example I are employed except as noted hereafter. The copolymer has a similar composition but the Mooney viscosity (ML–4/100° C.) is 69. A 2.9% by weight solution of the ethylene/propylene/1,4-hexadiene copolymer in tetrachloroethylene is supplied at the rate of 256 ml./min. corresponding to 11.6 grams/min. of copolymer. An aqueous solution containing 0.17 gram per liter of a surfactant (commercially available from Antara Chemicals Division, General Aniline & Film Corp. as "Igepal CO–890") made by condensing 40 moles of ethylene oxide with one mole of nonylphenol, is supplied at the rate of 375 ml./min. The surfactant concentration thus amounts to 0.5% by weight of the copolymer. The resulting 40% oil-in-water dispersion is fed at 65° C. at the rate of 630 ml./min. Within the steam distillation zones the spray solutions at 75° C. are supplied at the rate of 200 ml./min. In the first stage the temperature is 93.5° C. and the agitator speed is 1230 r.p.m. The effluent leaving after an average residence time of 4 minutes contains 8 grams of copolymer per liter. In the second stage the temperature is 100.2° C., and the agitator speed is 1130–1400 r.p.m. The effluent leaving after an average residence time of 25 minutes contains 38 grams per liter of copolymer.

As a consequence of using a very water-soluble surfactant, the copolymer separates as rather large crumbs which are quite buoyant; a high slurry concentration results in the second stage. The copolymer crumb which is isolated contains about 1.0% tetrachloroethylene by weight.

EXAMPLE IV

The procedure of Example III is repeated except that the surfactant employed (commercially available from Antara Chemicals as "Igepal CO–880") is less water soluble than "Igepal CO–890," being made by reacting 30 moles of ethylene oxide with one mole of nonylphenol; in addition, the average residence time in the first stage is increased to 5 minutes and in the second stage to 31 minutes. The irregular particles of well dispersed polymer crumbs formed are somewhat more suitable for isolation than those obtained in Example III.

EXAMPLE V

The general procedure and equipment described in Example III are employed except as noted hereafter. The surfactant employed (commercially available from Antara Chemicals as "Igepal CO–730") is less soluble in water than those used in Examples III and IV, being made by condensing only 15 moles of ethylene oxide with one mole of nonylphenol. The residence time is shortened to 3 minutes in the first steam distillation zone and to 19 minutes in the second steam distillation zone. The copolymer crumbs, isolated at the rate of 11 grams per minute, contain only about 1.2% tetrachloroethylene by weight of copolymer.

EXAMPLE VI

The apparatus and general procedure described in Example III above are employed except as noted hereafter. The surfactant employed (commercially available from Antara Chemicals as "Igepal CO–530") is less water-soluble than any of those described in Examples III–V, being made by condensing only 6–7 moles of ethylene oxide with one mole of nonylphenol. The residence time in the first steam zone is 4 minutes, that in the second is 18 minutes. The copolymer coagulates to give rather dense particles 2–3 mm. in diameter. The copolymer crumbs isolated at the rate of 10 grams per minute on drying contain about 0.9% by weight of tetrachloroethylene.

EXAMPLE VII

The ethylene/propylene/1,4-hexadiene copolymer made in tetrachloroethylene as described in Example I and isolated by drum drying, is dispersed in hexane to give a solution having a concentration of 7.7% copolymer by weight.

The equipment described in Example II is employed. The dispersion of copolymer in water is made continuously by feeding the copolymer solution at the rate of 356 ml./min. (corresponding to 18 grams/min. of copolymer) and 375 ml./min. of an aqueous surfactant solution containing 0.13 gram per liter of the "Igepal CO–850" described in Example II above. The 48% oil-in-water dispersion emerging from the mixer at 55° C. contains about 0.3% surfactant by weight of copolymer. Within the first steam distillation stage the average residence time is 1 minute, the average temperature s 70° C., and the agitator speed is about 1,170–1,310 r.p.m.; the 60° C. spray water is supplied at about 20 ml./min. In the second steam distillation stage the average residence time is 8 minutes, the temperature is 96.2–99.9° C., and the agitator speed is 910 r.p.m.; the 60° C. spray water is supplied at about 100 ml./min.

In the first stage the distillate output is about 312 ml./min. of hexane and 18.5 ml./min. of water. In the second stage, the output is about 8.6 ml./min. of hexane and 17.7 ml./min. of water. The crumb obtained is well dispersed, irregular in shape, and rather dense with an outer diameter of about 2 mm. on the average. The coplymer is collected from the second stage effluent at the rate of about 18 grams/min. in a slurry having a concentration of about 26 grams per liter.

EXAMPLE VIII

The general procedure and equipment described in Example I are employed except as noted hereafter. An 8% by weight solution of the ethylene/propylene/1,4-hexadiene copolymer in hexane is supplied at the rate of 450 ml./min., corresponding to about 24 grams/min. of the copolymer. An aqueous solution containing 0.12 gram per liter of the non-ionic surfactant "Igepal CO–850" described above is supplied at the rate of 450 ml./min. corresponding to a concentration of about 0.23% surfactant by weight of copolymer. The 50% oil-in-water dispersion at 50° C. enters the first steam distillation stage where the residence time is 1 minute, the temperature is 70° C., and the agitator speed 1,250 r.p.m. In the second distillation zone the residence time is 8 minutes, the temperature is 95–99° C. and agitation rate is 980 r.p.m. The irregular, rather dense crumbs which were produced in the effluent contain less than about 0.5% hexane by weight of copolymer.

EXAMPLE IX

A one-stage steam still comprising an agitated glass-baffled 2-liter glass kettle is employed in place of the two-stage apparatus described in Example I. The surfactant solution and the copolymer solution are separately metered to a T joint and the blend passed therefrom to a centrifugal mixer pump; the resulting oil-in-water type dispersion is passed into the bottom of a steam treatment zone at a point near the orifice of a steam inlet tube. The unreacted monomers and the organic solvent are vaporized by this steam and passed from the top of the chamber through a condenser and are collected. The copolymer crumbs rise to the upper portion of the water in the chamber and are drawn off through a take-off valve and collected on cheese cloth.

A 3% by weight copolymer solution in tetrachloroethylene is prepared in accordance with the general directions of U.S. Patent 2,933,480 by reacting ethylene, propylene, and 1,4-hexadiene in the presence of a catalyst made by mixing vanadium oxytrichloride and diisobutyl aluminum monochloride. This copolymer is similar to the one used in Example III. A surfactant solution containing 0.5 gram per liter of an anionic type surfactant ("Lomar PW" commercially available from Jacques Wolfe and Co.) is made by condensing sodium naphthalene sulfonate with formaldehyde. A 31% oil-in-water dispersion is made by continuously feeding the copolymer solution and the surfactant solution at the respective rates of 34 ml./min. and 75 ml./min., corresponding to 1.6 grams of copolymer per minute and a surfactant concentration of 2.3% by weight of copolymer. The oil-in-water dispersion at a temperature of approximately 50° C. enters the steam distillation chamber, where the temperature is maintained at 94–95° C., and remains there for an average residence time of approximately 40 minutes. The copolymer is obtained at the rate of about 0.86 gram per minute in a slurry having a concentration of about 28 grams of copolymer per liter. The distillation rate for tetrachloroethylene is about 31 ml./min. The residual tetrachloroethylene in the 1–3 mm. copolymer crumbs is about 40% by weight (water-free basis).

EXAMPLE X

The general equipment and procedure of Example IX are used except as noted hereafter. A 3% by weight solution of ethylene/propylene/1,4-hexadiene copolymer in tetrachloroethylene is fed to the mixing T at the rate of 34 ml./min. An aqueous mixture containing 0.4 gram per liter of zinc stearate and 0.06 gram per liter of "Igepal CO–850" is pumped at the rate of 80 ml./min., supplying about 2% zinc stearate and 0.3% "Igepal CO–850" by weight of copolymer. The resulting oil-in-water dispersion supplies 1.6 grams of copolymer per minute to the steam distillation chamber which is maintained at 92–93° C. and stirred at the rate of about 1,500–2,090 r.p.m. The tetrachloroethylene distills off at the rate of about 33 ml./min. giving a slurry concentration of about 18 grams copolymer per liter within the chamber. The crumbs of polymer isolated are found to be satisfactory in size and quality.

EXAMPLE XI

A.—Preparation of copolymer solution

A continuous reactor is employed having a residence time of 10 minutes and operated at 41° C. A total of 3.87 gram-moles of monomers is fed per liter of reactor effluent; the molar ratio of propylene to ethylene is 2.5:1 and the molar ratio of 1,4-hexadiene to propylene is 0.061:1. For each 100 parts of total (ethylene plus propylene) 0.0187 part of hydrogen is supplied. The catalyst is formed in situ in the reactor by supplying about 0.004 gram-mole of diisobutyl aluminum chloride and 0.0002 gram-mole of vanadium tris(acetylacetonate) for every liter of reactor effluent. Tetrachloroethylene is supplied continually. The ethylene/propylene/1,4-hexadiene copolymer thereby produced has a Mooney viscosity (ML–4/100° C.) of about 45 and has the following monomer unit composition by weight: ethylene, 59.9%; propylene, 37%; 1,4-hexadiene, 3.1%.

B.—Isolation of copolymer from solution

A 3.1% by weight solution of ethylene/propylene/1,4-hexadiene copolymer in tetrachloroethylene, prepared by the procedure of Part A above, is treated by the general directions of Example II except as noted hereafter. The wood baffles extend to about one inch below the liquid surface. The surfactant solution contains 0.18 gram of surfactant per liter and the copolymers and surfactant solutions are fed at the respective rates of 183 and 274 ml./min. The 40% oil-in-water dispersion has a temperature of about 88° C. and has 0.54 part of surfactant per 100 parts of copolymer by weight. The first stage steam zone is operated at 93.3° C. with a residence time of about 3 minutes and agitated at the rate of 1325 r.p.m. The second stage steam zone is operated at about 99.1° C. with a residence time of about 10 minutes and agitated at the rate of 1050 r.p.m. A total of 160 ml./min. tetrachloroethylene is removed. The copolymer crumb, collected at the rate of about 9 grams/min., has a diameter in the range 0.5–3 mm. and contains about 0.7% tetrachloroethylene by weight.

EXAMPLE XII

Example XI, Part A, is repeated and the 3.1% solution prepared therein is concentrated to a 6.8% solution by distillation of tetrachloroethylene. Copolymer crumbs are isolated by treating the 6.8% solution by the general directions of Example II except as noted hereafter. The wood baffles extend to about one inch below the liquid surface. The surfactant solution contains 0.3 gram of surfactant per liter and the copolymer and surfactant solutions enter the mixer at the rates of 136 and 282 ml./min., respectively. The 33% oil-in-water dispersion obtained has a temperature of about 83° C. and has 0.53% surfactant (based on copolymer). In the first steam distillation stage the temperature is 93.6° C., the agitation is at 1300 r.p.m., and the residence time is about 3 minutes. In the second stage the temperature is 99.3° C., the agitation is at 990 r.p.m., and the residence time is about 8 minutes. The total tetrachloroethylene distillation rate is about 116 ml./min. The copolymer is obtained at the rate of about 12 grams/min. in the form of crumbs having a diameter in the range 0.5–3 mm. and containing about 1.4% tetrachloroethylene by weight.

The solvent-free particulate copolymer obtained by the present invention is found to be quite suitable for use in preparing tires, inner tubes, hose and tubing, wire and cable jackets, footwear, sponges, coated fabrics, and a wide variety of coated or molded articles.

What is claimed is:

1. A process for producing solvent-free, finely divided crumbs of about 0.5 to 5 mm. in diameter of a water-insoluble hydrocarbon copolymer of ethylene, an α-olefin and a non-conjugated hydrocarbon diene, said copolymer having a Mooney viscosity (ML–4/100° C.) of at least about 40, which process comprises: (I) forming an unstable oil-in-water dispersion in a continuous aqueous phase by mixing with high-shear agitation (a) a 3 to 15 weight percent solution of said copolymer in an inert organic solvent with (b) water containing from about 0.01 to 0.1 weight percent of a surface-active dispersing agent, at a temperature of from 50° to 100° C., the ratio of (a)

to (b) being within the range of from 1:2 to 1:1; (II) continuously mixing said dispersion with steam at a first stage while applying vigorous agitation to the mixture thereby removing solvent from the mixture with said copolymer forming into crumbs, the residence time of said copolymer in the first stage being from about 1 to 5 minutes; (III) passing the steam treated mixture into a second stage where it is again mixed with steam thereby reducing the solvent content of the crumbs below about 2 weight percent, the residence time of the copolymer in the second stage being from about 2 to 20 minutes; and (IV) continuously removing and separating the crumbs of copolymer so formed.

2. A process as defined in claim 1 wherein said surface-active dispersing agent is a nonyl phenyl monoether of a polyethylene ether glycol prepared by reaction from about 15 to 20 molar proportions of ethylene oxide with 1 molar proportion of nonyl phenol.

References Cited

UNITED STATES PATENTS

| | | | |
|---|---|---|---|
| 2,933,480 | 4/1960 | Gresham et al. | 260—80.5 |
| 2,969,347 | 1/1961 | Bellinger et al. | 260—94.9 |
| 3,071,555 | 1/1963 | Hunter et al. | 260—29.6 |
| 3,080,354 | 3/1963 | Moon | 260—94.9 |
| 3,112,282 | 11/1963 | Jones et al. | 260—29.6 |

JOSEPH L. SCHOFER, *Primary Examiner.*

W. HOOVER, S. M. LEVIN, *Assistant Examiners.*

UNITED STATES PATENT OFFICE
CERTIFICATE OF CORRECTION

Patent No. 3,350,370                                    October 31, 1967

William John Keller et al.

It is hereby certified that error appears in the above numbered patent requiring correction and that the said Letters Patent should read as corrected below.

Column 3, line 38, for "monomers" read -- monomer --; column 4, line 54, for "solutions" read -- solution --; column 10, line 47, for "s" read -- is --; line 49, for "20" read -- 200 --.

Signed and sealed this 17th day of December 1968.

(SEAL)
Attest:

Edward M. Fletcher, Jr.                           EDWARD J. BRENNER
Attesting Officer                                 Commissioner of Patents